United States Patent [19]

Iwasaki et al.

[11] Patent Number: 5,589,752
[45] Date of Patent: Dec. 31, 1996

[54] CONTROLLER FOR SWITCHED RELUCTANCE MOTOR

[75] Inventors: Shinichiro Iwasaki, Anjou; Masanori Sugiyama, Nishio; Chiaki Umemura, Toyohashi; Akemi Ookawa, Chita-gun; Hisayoshi Takahashi, Kariya, all of Japan

[73] Assignee: Aisin Seiki Kabushiki Kaisha, Kariya, Japan

[21] Appl. No.: 428,367

[22] Filed: Apr. 25, 1995

[30] Foreign Application Priority Data

Apr. 25, 1994 [JP] Japan .................................. 6-086769

[51] Int. Cl.⁶ ....................................................... H02P 5/05
[52] U.S. Cl. .............................................. 318/701; 318/254
[58] Field of Search .................................... 318/138, 254, 318/432, 433, 439, 685, 696, 701

[56] References Cited

U.S. PATENT DOCUMENTS 4,714,039 12/1987 Shimada .
4,943,760 7/1990 Byrne et al. .............................. 318/701
5,281,903 1/1994 Oku et al. ................................ 318/701
5,469,215 11/1995 Nashiki .................................... 318/432

FOREIGN PATENT DOCUMENTS 1-298940 12/1989 Japan .

*Primary Examiner*—Bentsu Ro
*Attorney, Agent, or Firm*—Sughrue, Mion, Zinn, Macpeak & Seas

[57] ABSTRACT

The generation of oscillations and acoustic noises which result from a rapid change in the magnetic flux upon switching the energization is suppressed, while simultaneously preventing a reduction in the driving efficiency and preventing a resonance from occurring. The current waveform as the current rises or fails is switched in accordance with the rotational speed of the SR motor to minimize a change in the magnetic flux, thus suppressing a reduction in the driving torque. A time interval required for the current to rise or fall is chosen to be greater than one-half the period of the natural frequency of SR motor.

6 Claims, 14 Drawing Sheets current map

|  | torque [N·m] | | | | | | |
|---|---|---|---|---|---|---|---|
|  | ···10 | 15 | 20 | 25 | 30 | 35 | ··· |
| number of revolutions [rpm] ⋮ 200 300 400 500 600 700 ⋮ | ⋮ C11 C12 C13 C14 C15 C16 ⋮ | ⋮ C21 C22 C23 C24 C25 C26 ⋮ | ⋮ C31 C32 C33 C34 C35 C36 ⋮ | ⋮ C41 C42 C43 C44 C45 C46 ⋮ | ⋮ C51 C52 C53 C54 C55 C56 ⋮ | ⋮ C61 C62 C63 C64 C65 C66 ⋮ | ⋮ |

Example (content of C34):
- 52.5° turn-on angle
- 82.5° turn-off angle
- 200 [A] target current value waveform map

| | | content | |
|---|---|---|---|
| | | angular interval for rising (D1n) | angular interval for falling (D2n) |
| number of revolutions [rpm] | ⋮ | ⋮ | ⋮ |
| | 200 | D11 | D21 |
| | 300 | D12 | D22 |
| | 400 | D13 | D23 |
| | 500 | D14 | D24 |
| | 600 | D15 | D25 |
| | 700 | D16 | D26 |
| | ⋮ | ⋮ | ⋮ | current map

|  | torque [N·m] | | | | | | |
|---|---|---|---|---|---|---|---|
|  | ···10 | 15 | 20 | 25 | 30 | 35 | ··· |
| number of revolutions [rpm] ⋮ | ⋮ | ⋮ | ⋮ | ⋮ | ⋮ | ⋮ | ⋮ |
| 200 | C11 | C21 | C31 | C41 | C51 | C61 |  |
| 300 | C12 | C22 | C32 | C42 | C52 | C62 |  |
| 400 | C13 | C23 | C33 | C43 | C53 | C63 |  |
| 500 | C14 | C24 | C34 | C44 | C54 | C64 |  |
| 600 | C15 | C25 | C35 | C45 | C55 | C65 |  |
| 700 | C16 | C26 | C36 | C46 | C56 | C66 |  |
| ⋮ | ⋮ | ⋮ | ⋮ | ⋮ | ⋮ | ⋮ | ⋮ |

Example
(content of C34) : 52.5° turn-on angle
82.5° turn-off angle
200 [A] upper limit of current
waveform pattern No. 3

CONTROLLER FOR SWITCHED RELUCTANCE MOTOR

FIELD OF THE INVENTION

The invention relates to a control of switched reluctance motor.

BACKGROUND OF THE INVENTION

A switched reluctance motor (hereafter abbreviated as SR motor) includes a rotor having poles which are generally constructed as salient poles, and a stator having poles which project radially inward. The rotor comprises an iron core which is simply formed by a lamination of iron sheets, while the stator includes a concentrated winding coil for each pole. Each pole on the stator acts as an electromagnet, and the magnetic force from the stator attracts the individual poles of the rotor to cause the rotor to rotate, thus operating the SR motor. Accordingly, the rotor can be rotated in any desired direction by sequentially switching the energization of the coils disposed around the respective poles of the stator in accordance with the rotational position of each pole on the rotor. A prior art for such SR motor can be exemplified by Japanese Laid-Open Patent Application No. 298,940/1989, for example.

SR motor has advantages that it is simple in construction, is robust mechanically and is capable of operation under elevated temperatures. However, as a matter of practice, it is not utilized in actuality. One reason herefor resides in the generation of acoustic noises of a high level during its rotation.

Since the energization for each of the poles on the stator is turned on or off when a respective pole on the rotor assumes a particular rotational position, it will be seen that the magnitide of the magnetic attraction which is applied to the rotor rapidly changes upon such switching. This causes mechanical oscillations of relatively high levels to be produced within the rotor and the stator, giving rise to the generation of acoustical noises.

In Japanese Laid-Open Patent Application No. 298,940/ 1989 cited above, a rotational position signal having a slow rising and falling edge is produced and is used to provide a slow current rise when a particular coil is to be energized and to provide a slow current fall when the coil is to be deenergized. In this manner, it is possible to suppress the generation of oscillations and acoustical noises from the SR motor.

However, because of the use of such rotational position signal, the effect of suppressing the acoustical noises is reduced for a high speed rotation where the current rises or falls more rapidly when the coil is to be energized or deenergized. In addition, during a low speed rotation, where the current rises or falls slowly when the coil is to be energized or deenergized, it follows that a sufficient current flow cannot be supplied as required to produce a torque of an increased magnitude, resulting in a disadvantage that an efficient rotation of the rotor is prevented. In particular, as the rotational speed of the rotor increases, the duration during which the coil is energized per switching is reduced to reduce the magnitude of the current flow, whereby the magnitude of rotating torque generated is reduced. In addition, this suffers from a degraded. efficiency or a failure to provide required torque unless the timing of turning on or off the coils is changed in accordance with the number of revolutions or the magnitude of torque required.

SUMMARY OF THE INVENTION

It is a task of the invention to suppress a reduction in the magnitude of rotating torque while efficiently suppressing the generation of acoustical noises during the rotation of SR motor.

The above task is solved in a controller for SR motor including means (1d) for detecting a rotational position of a rotor (R) and for switching the turn on/off of electrical coils when each pole of the rotor assumes a particular rotational position. In accordance with the invention, the controller comprises speed detecting means (1e) for detecting the rotational speed of the rotor; and current waveform control means (11, 13b) for modifying a current waveform as it rises and falls upon switching the energization of an electrical coil in accordance with the rotational speed of the rotor as detected by the speed detecting means.

In a modification, a time interval required by the waveform control means to accomplish a current rise or current fall is chosen to be greater than one-half the period of natural oscillation of the SR motor.

It is to be understood that numerals and characters appearing in parentheses above represent reference numerals and characters which are used to designate corresponding elements appearing in an embodiment to be described later, but that the elements used to implement the invention are not limited to the specific elements shown in the embodiment.

A control technique for SR motor generally employs a target value of a current to be passed through a coil in a binary fashion as illustrated in FIG. 9, or in the form of a square wave. Assuming that the current flows as indicated by the target value, the magnitude of a magnetic flux or its time derivative changes in a manner illustrated in FIG. 9. Accordingly, upon switching the current from off to on or reversely from on to off, there occurs a very large change in the magnetic flux. Such change in the magnetic flux is applied to various parts of SR motor as a change in the magnetic attraction, causing mechanical oscillations of increased magnitude to the motor. In actuality, the current flow through the coil lags behind the target value as it rises or falls, but nevertheless, acoustical noises are generated because of the increased magnitude of the change in of the magnetic flux.

When the target value for the current to be passed through the coil is controlled in a manner illustrated in FIG. 10 so that the current rises or falls more slowly, the magnitude of the change in the magnetic flux upon switching the current flow will be reduced, thus allowing the oscillations and the acoustical level of noises to be suppressed. Such control is illustrated in FIG. 8 of Japanese Laid-Open Patent Application No. 298,940/1989 cited above. However, as mentioned previously, when the current rises or falls at a substantially increased rate as the coil is to be energized or deenergized, the effect of suppressing the acoustical noises will be diminished. On the contrary, during a low speed rotation when the rate at which the current rises or falls as the coil is to be energized or to be deenergized is substantially retarded, a sufficient current flow cannot be achieved when a torque of sufficient magnitude is required, thus resulting in a failure to achieve an efficient rotation of the rotor. In particular, as the rotational speed of the rotor increases, the duration during which the coil is energized per switching is reduced, whereby the current flow is greatly reduced, and this in turn reduces the magnitude of the rotating torque generated.

In accordance with the invention, the current waveform as it rises or falls when the energization of the coil is turned on or off is modified in accordance with the rotational speed of the rotor which is detected to allow an automatic selection of a waveform which is capable of sufficiently suppressing a reduction in the driving torque and also capable of sufficiently suppressing the acoustical level of noises.

It will be understood that the noise level produced as a result of the oscillations of SR motor will be amplified by resonance. Resonance occurs when the frequency of oscillations which results from the switching of the energization coincides with the natural frequency of SR motor. In thee event a resonance occurs, the amplitude of oscillations is amplified, increasing the acoustical level of noises.

In a modification of the invention, the waveform is controlled such that the time interval required for the current to rise or fall is greater than one-half the period of the natural oscillation of SR motor. In this manner, the period over which the magnetic attraction varies is increased, whereby the frequency of oscillations resulting from the switching of the energization will be maintained below the natural frequency of SR motor. In this manner, the occurrence of a resonance is prevented in a reliable manner, avoiding an increase in the acoustic level of noises.

Other objects and features of the invention will become apparent from the following description of several embodiments thereof with reference to the attached drawings.

DETAILED DESCRIPTION OF PREFERRED EMBODIMENT

Figure 1:
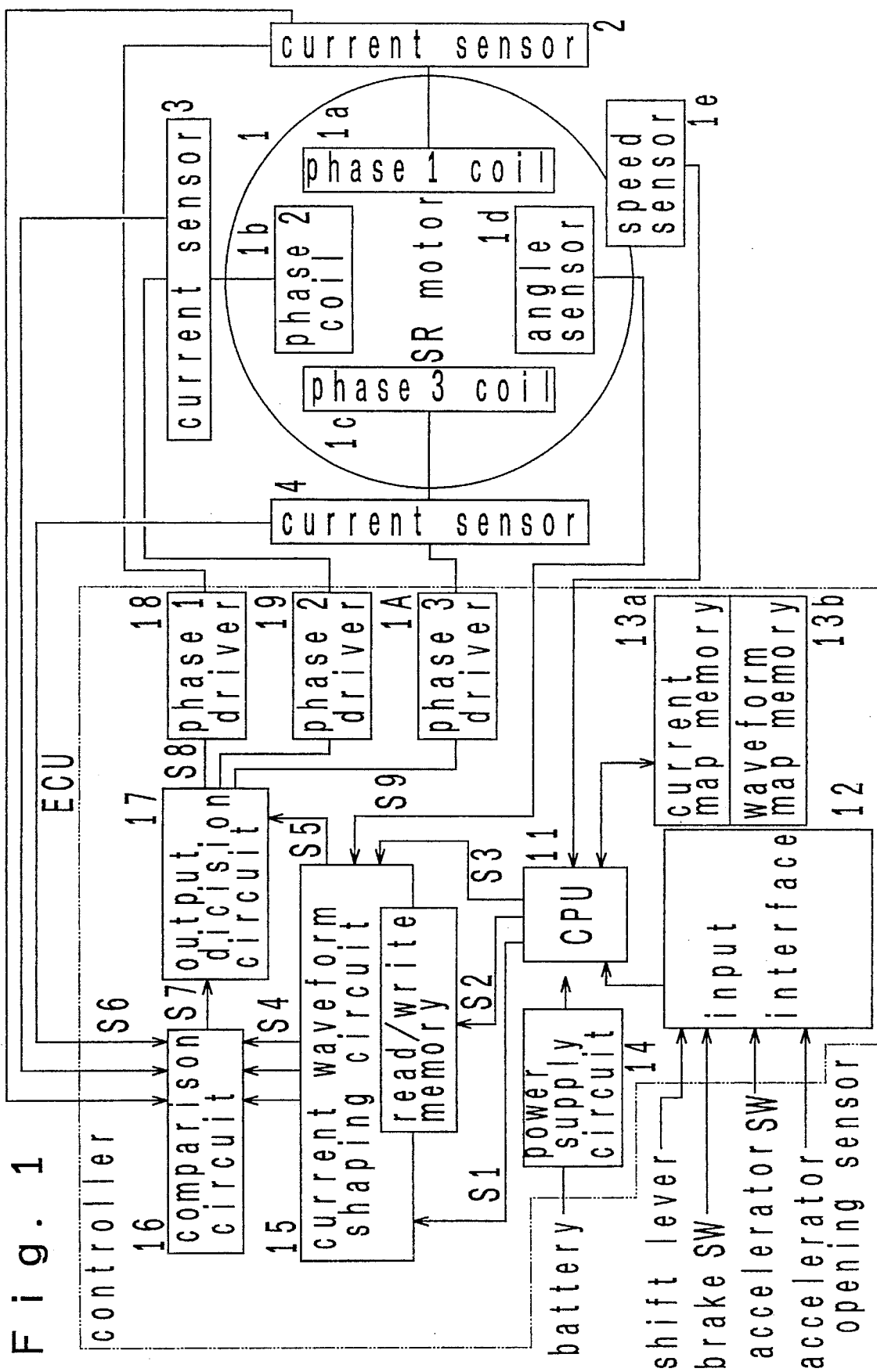
FIG. 1 is a block diagram of a general arrangement of one embodiment of the invention.

A general arrangement of a controller according to one embodiment of the invention is shown in FIG. 1. The arrangement shown in FIG. 1 constitutes an essential portion of a drive unit for an electromobile. In this example, a single SR motor 1 is provided as a drive source, and is controlled by a controller ECU. The controller ECU controls the driving of SR motor 1 on the basis of information which is fed from a shift lever, a brake switch, an accelerator switch and an accelerator opening sensor. The electrical circuit is fed from a storage battery.

Figures 3A, 3B, 3C:
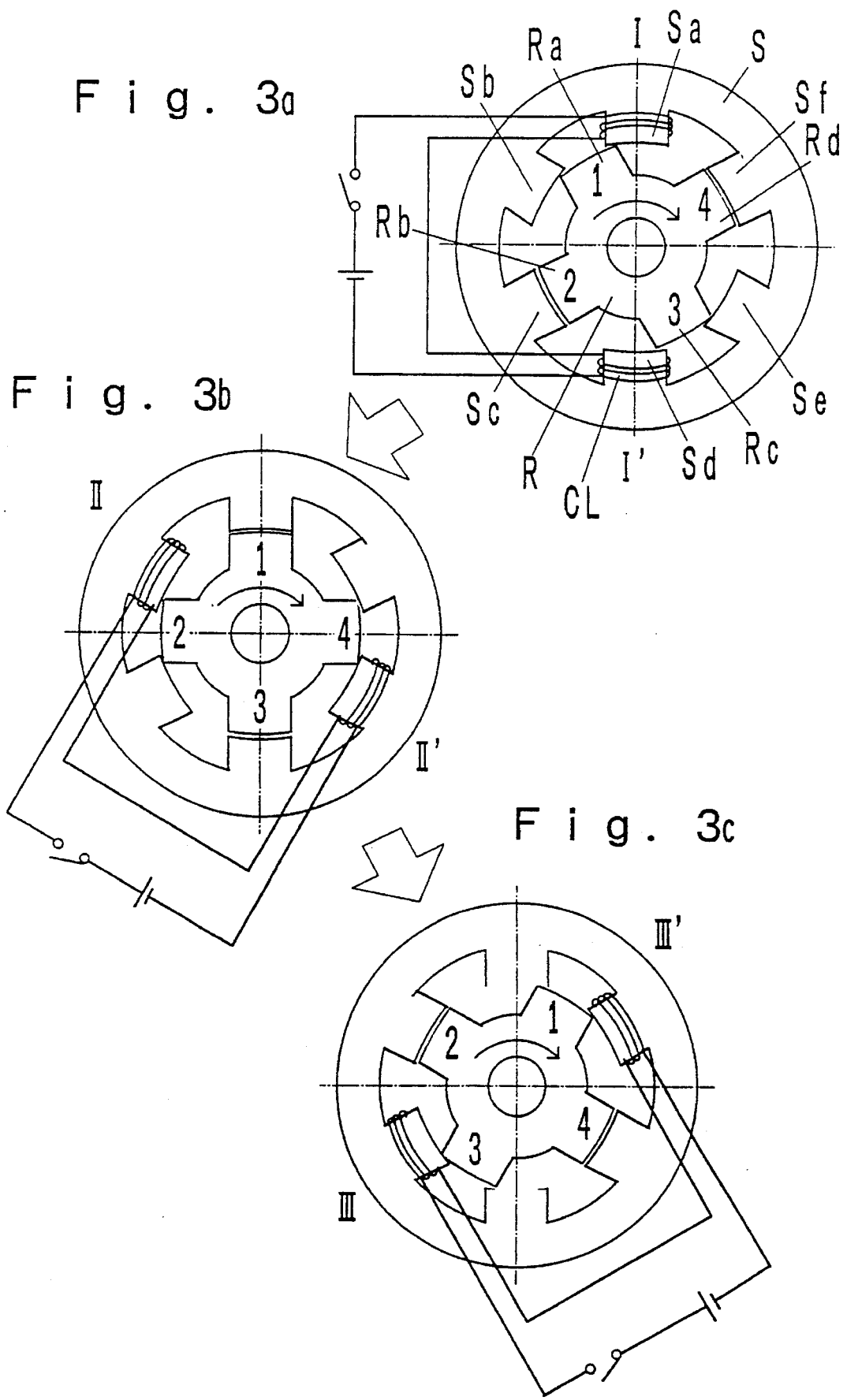
FIGS. 3a, 3b, and 3c are front views of SR motor used in an embodiment, illustrating a fundamental internal construction and an operational sequence.

A fundamental construction of SR motor 1 as well as the principle of its driving is illustrated in FIG. 3. SR motor 1 shown in FIG. 3 comprises a stator S, and a rotor R which is rotatably supported within the internal space of the stator. The rotor R comprises a lamination of a multiplicity of thin iron sheets, and is formed with four salient poles Ra, Rb, Rc and Rd at a radial spacing of 90° around its circumference. The stator S also comprises a lamination of a multiplicity of thin iron sheets, and is formed with six radially inwardly projecting poles Sa, Sb, Sc, Sd, Se and Sf at a radial spacing of 60° around its inner periphery. An electric coil CL is disposed around each of the poles Sa, Sb, Sc, Sd, Se and Sf of the stator S, even though only two coils are shown in FIG. 3.

Coils CL disposed on the poles Sa, Sd of the stator S may be denoted as comprising a first phase, the coils CL disposed around the poles Sb, Se of the stator S as a second phase, and the coils CL disposed around the poles Sc, Sf of the stator S as a third phase. Using such denotation, the rotor R can be continuously driven for clockwise rotation by energizing the coils CL in the sequence of the first, the second and the third phase in accordance with the pole position of the rotor R, as indicated in FIG. 3. Thus, the energized pole of the stator S constitutes an electromagnet, attracting adjacent pole (or poles) of the rotor R for angular movement. To continue the rotation, it is necessary that the energization of the coils be switched as the rotor R rotates. In actuality, the coils to be energized may be switched in the sequence of the first, the second and the third phase for each rotation of the rotor R through 30° for the SR motor 1 shown.

Returning to FIG. 1, SR motor 1 is provided with three phase driving coils 1a, 1b, 1c, an angle sensor 1d for detecting the rotational position (angular position) of the rotor R, and a speed sensor 1e for detecting the rotational speed. Each of the coils 1a, 1b and 1c is connected to phase drivers 18, 19 and 1A, respectively, and current sensors 2, 3 and 4 are connected in signal lines which connect between the respective coils 1a, 1b, 1c and the associated drivers 18, 19 and 1A, respectively. These current sensors 2, 3 and 4 produce a voltage which is proportional to the actual current flow through the respective coils 1a, 1b and 1c and which is delivered as a current signal S6.

The controller ECU internally includes CPU (microcomputer) 11, an input interface 12, a current map memory 13a, a waveform map memory 13b, a power supply circuit 14, a current waveform shaping circuit 15, a comparison circuit 16, an output decision circuit 17, and the drivers 18, 19 and 1A. On the basis of information which is fed from a shift lever, a brake switch, an accelerator switch and an accelerator opening sensor, the controller ECU sequentially calculates a driving speed and a driving torque of SR motor 1, and controls the current to be passed through the respective coils 1a, 1b and 1c of SR motor 1 on the basis of such result of calculation.

Figure 2:
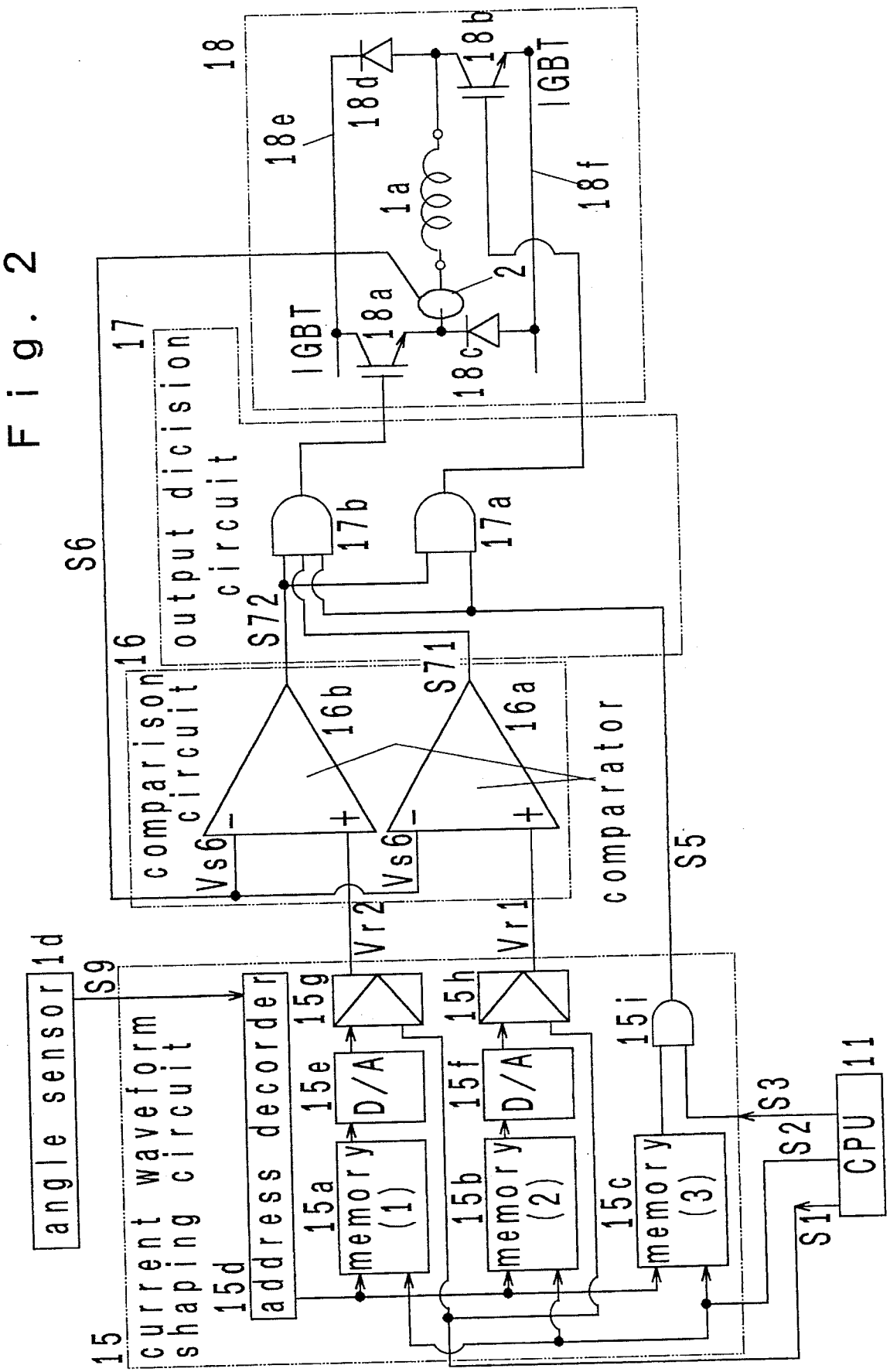
FIG. 2 is a block diagram of specific examples of principal parts shown in FIG. 1.

A specific example of principal part of the circuit arrangement shown in FIG. 1 is illustrated in FIG. 2. It is to be understood that FIG. 2 shows only the circuit which controls the energization of the coil 1a of SR motor 1, but that the general arrangement includes similar circuits for controlling the energization of other coils 1b and 1c.

Referring to FIG. 2, one end of the coil 1a is connected through a switching transistor (IGBT) 18a to a high potential line 18e of the power supply while the other end of the coil 1a is connected through a switching transistor (IGBT) 18b to a low potential line 18f of the power supply. A diode 18c is connected across the emitter of the transistor 18a and the low potential line 18f, and a diode 18d is connected between the collector of transistor 18b and the high potential line 18e. Accordingly, when the transistors 18a and 18b are both turned on, a current path is established between the lines 18e and 18f through the coil 1a. When either one or both of the transistors is turned off, the energization of the coil 1a can be interrupted.

The output decision circuit 17 includes a pair of AND gates 17a, 17b. An output terminal of the gate 17a is connected to the gate terminal of transistor 18b while an output terminal of the gate 17b is connected to the gate terminal of the transistor 18a. Signals S72 and S5 are input to the gate 17a while signals S71, S72 and S5 are input to the gate 17b. Signals S71 and S72 are binary signals delivered by analog comparators 16a and 16b, respectively, of the comparison circuit 16. Signal S5 is a binary signal delivered by the current waveform shaping circuit 15.

Analog comparators 16a of the comparison circuit 16 compares a first reference voltage Vr1 delivered from the circuit 15 against the voltage level of the signal S6 corresponding to the current detected by the current sensor 2, and delivers a result of such comparison as the binary signal S71. Similarly, the comparator 16b compares a second reference voltage Vr2 delivered by the circuit 15 against the voltage level of the signal S6 corresponding to the current detected by the current sensor 2, and delivers a result of such comparison as the binary signal S72. In the present embodiment, a relationship: Vr1<Vr2 applies.

When the signal S5 assumes a high level H, the status of the transistors 18a, 18b in the driver 18 assumes one of the three conditions, depending on the relative magnitude of the voltage level Vs6 of the signal S6, and the reference voltages Vr1 and Vr2. Specifically, if Vs6<Vr1, the signals S71 and S72 both assume a high level, whereby the gates 17a and 17b deliver outputs of a high level H, turning the both transistors 18a, 18b on. If Vr2<Vs6, the signals S71, S72 both assume a low level, whereby the gates 17a and 17b each deliver an output of a low level L, thus turning the both transistors 18a, 18b off. Finally, if Vr1<Vs6<Vr2, the signal S71 assumes a low level while the signal S72 assumes a high level H, whereby an output from the gate 17a assumes a high level H while an output from the gate 17b remains at its low level L, thus turning the transistor 18a off and turning the transistor 18b on.

Thus, there are three status, namely, one in which the transistors 18a, 18b are both on, another in which they are both off and further in which one of the transistors on while the other is off, and the choice of either status is determined whether the level of the voltage Vs6 is below Vr1, between Vr1 and Vr2 or higher than Vr2.

When the signal S5 assumes a low level, the outputs from the gates 17a, 17b are always at its low level L independently from the status of the signals S71, S72 delivered from the comparison circuit 16, whereby the transistors 18a, 18b are both off.

The rising response of the current flow through the coil 1a when the transistors 18a, 18b are both turned on (the rate at which the current increases) is determined by the time constant of the circuit, and cannot be changed by control. However, when interrupting the current, the falling response of the current when the both transistors 18a, 18b are turned off is different from the current falling response when the transistor 18a is turned off while the transistor 18b remains on. In this manner, the rate at which the current falls can be adjusted by choosing between the switching off of the both transistors or either transistor. Specifically, the rate at which the current changes is more rapid when the transistors 18a, 18b are both turned off than when the transistor 18a alone is turned off while the transistor 18b remains on.

When there is little change in the current target values (Vr1, Vr2), a deviation of the actual current level (Vs6) from the reference level (Vr1) cannot increase if the current falling rate is retarded, whereby the relationship Vs6<Vr2 is maintained. In such instance, the excursion of or a fluctuation in the current is small. When the target current values (Vr1, Vr2) are changed as when switching the phase of coils to be energized, a retarded current falling rate results in Vs6>Vr2. In this instance, the both transistors 18a, 18b are turned off, whereby the current falling rate increases, allowing the current to track the target values (Vr1, Vr2) rapidly. When a change in the target values is removed, a deviation between the reference voltage Vr1 and the current level Vs6 is reduced, whereby the current falling rate is again retarded.

In this manner, a tracking lag of the current with respect to a change in the target value can be prevented, and when a change in the target value is small, the rate of change in the current is retarded, whereby the generation of oscillations and noises is suppressed.

When the current falling rate is switched by the signals S71, S72 delivered by the comparison circuit 16 shown in FIG. 2, the actual switching tends to be lagging slightly with respect to the optimum timing of switching. Thus, the current falling rate should be accelerated ideally at the time when the target value decreases rapidly, the signal S72 cannot assume a level L unless the actual current deviation becomes increased, thus producing a time lag. Accordingly, when the target value changes very rapidly, the automatic switching of the rate of change in terms of the signals S71, S72 alone may be insufficient to assure a tracking capability of the current with respect to the target value.

To accommodate for this, in the present embodiment, the signal S5 is-controlled to accelerate the current falling rate independently from the magnitude of the current (Vs6). Specifically, when the signal S5 assumes a low level L, the transistors 18a, 18b can be simultaneously turned off, independently from the signals S71, S72, thus accelerating the current falling rate.

Referring to FIG. 2, the circuit 15 delivers the two reference voltages Vr1, Vr2 and the binary signal S5, as mentioned previously. These voltages and the signal are produced on the basis of information which is stored in memories (RAM) 15b, 15a and 15c, each of which store 8 bit, 8 bit, and 1 bit, respectively, at each address thereof. 8 bit data read from the memory 15a is converted into an analog voltage by D/A converter 15e and provides the reference voltage Vr2 after passing through an amplifier 15g. Similarly, 8 bit data read from memory 15b is converted into an analog voltage at D/A converter 15f, and provides the reference voltage Vr1 after passing through an amplifier 15h. The level of an analog signal S1 delivered by CPU 11 is added to the input of each amplifier 15g or 15h. By adjusting the level of the signal S1, a fine adjustment of the reference voltages Vr1 and Vr2 is allowed. 1 bit data from memory 15c is passed through an AND gate 15i to provide the signal S5. A binary signal (start/stop signal) S3 delivered by CPU 11 is applied to one input of the gate 15i. When SR motor 1 is being driven, the signal S3 normally assumes a high level H, whereby the output signal from the memory 15c is directly used as the binary signal S5.

Each of the memories 15a, 15b and 15c has a number of addresses, and each address corresponds to a rotational position (angular position) of the rotor R in increment of one degree.

Address decoder 15d forms an address from a rotational position signal S9 of the rotor which is detected by the angle sensor 1d. This address is simultaneously fed to the address inputs of the three memories 15a, 15b and 15c. Accordingly, as SR motor 1 rotates, the memories 15a, 15b and 15c sequentially deliver data which are stored at addresses corresponding to the respective rotational positions of the rotor. Accordingly, the reference voltages Vr1, Vr2 and the binary signal S5 can vary with such rotational position.

Figure 4:
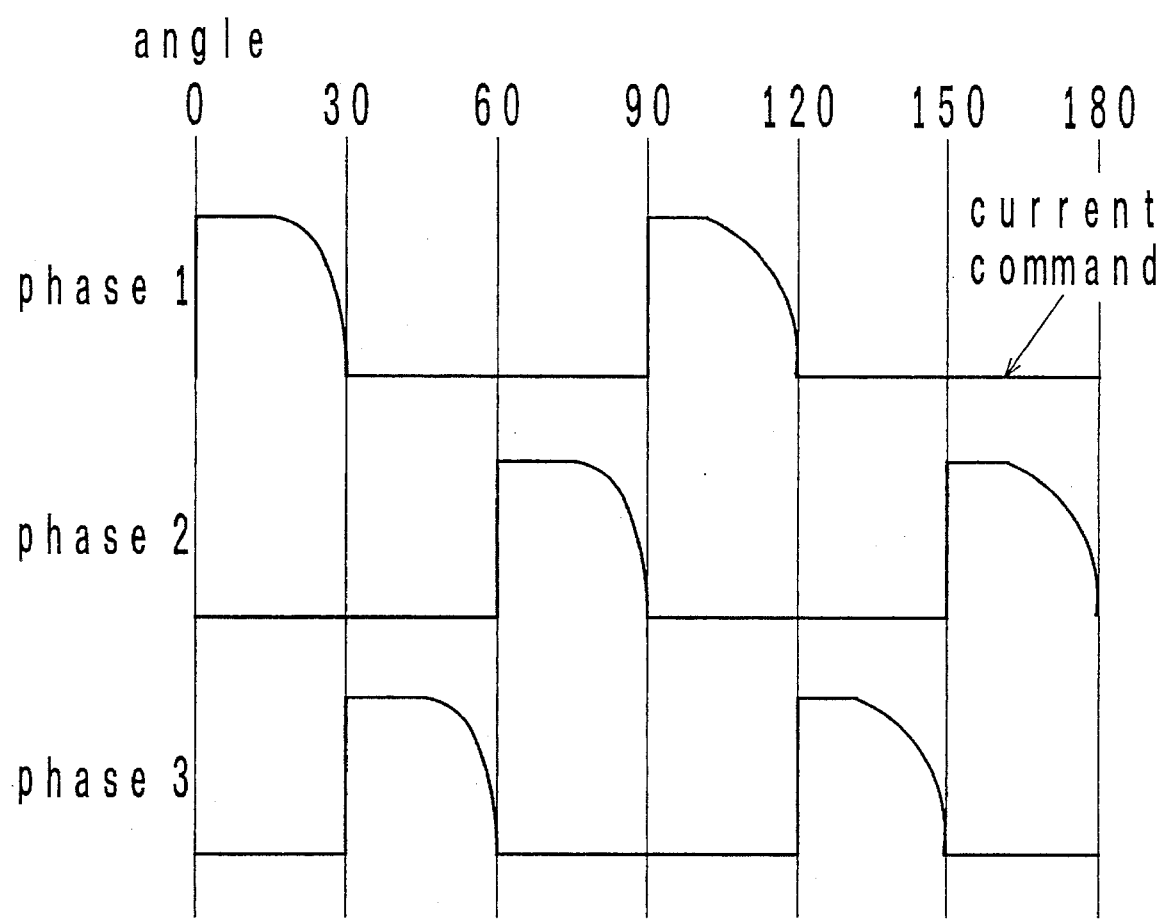
FIG. 4 is a timing chart of an example of waveform of energizing current command used when driving SR motor of the embodiment.
Figure 5:
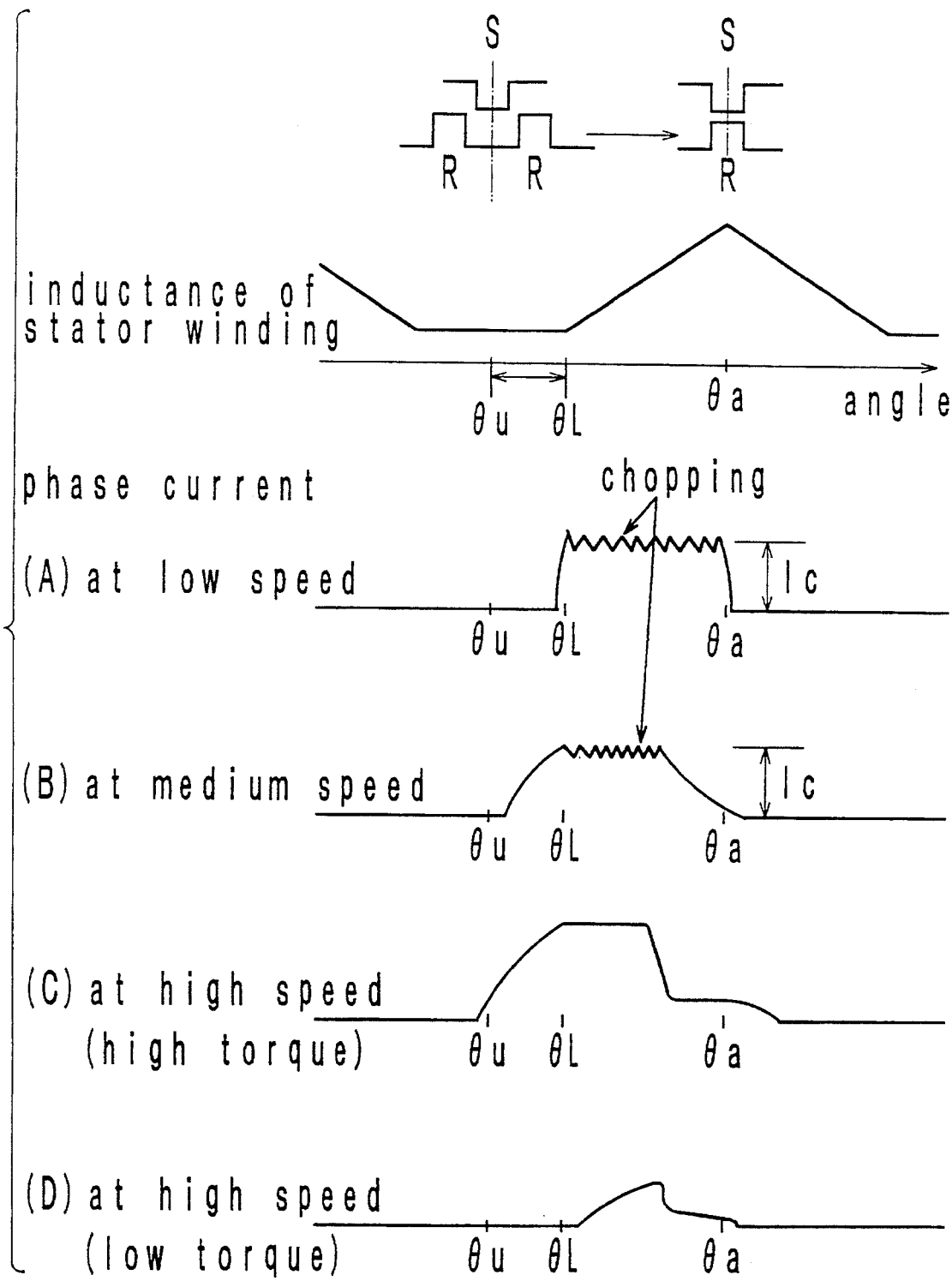
FIG. 5 is a series of timing charts illustrating changes in the energizing current waveform which is to be passed through SR motor occurring in accordance with a driving condition.
Figure 8:
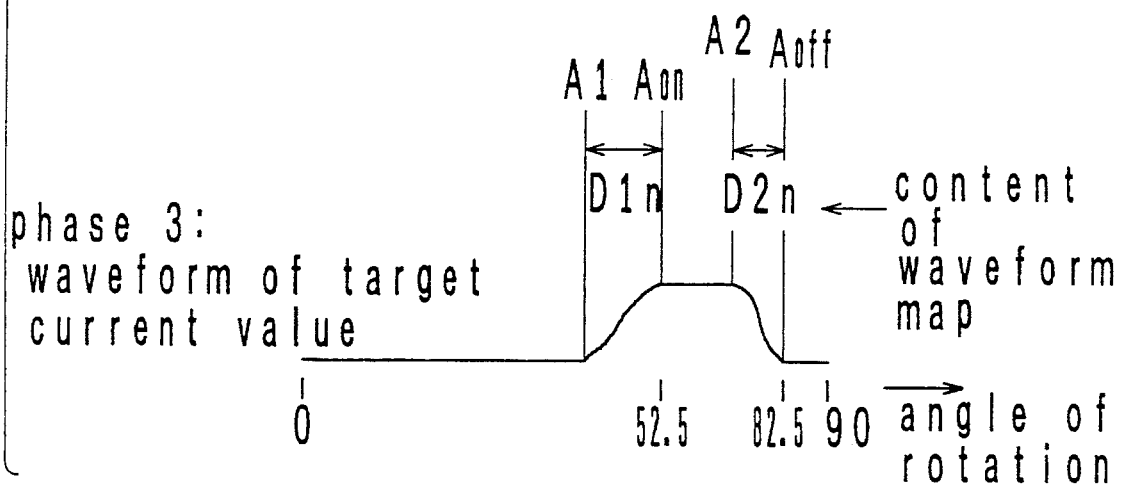
FIG. 8 is a map illustrating the content of an energization map memory.
Figure 9A:
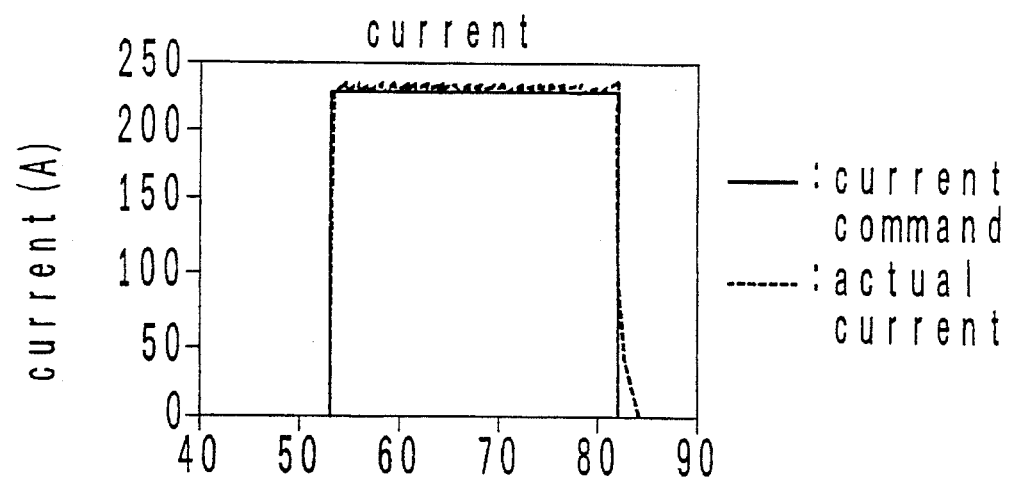
FIGS. 9a, 9b, and 9c are a series of timing charts illustrating changes in the current, magnetic flux and time derivative of the magnetic flux according to a conventional energization control.
Figure 9B:
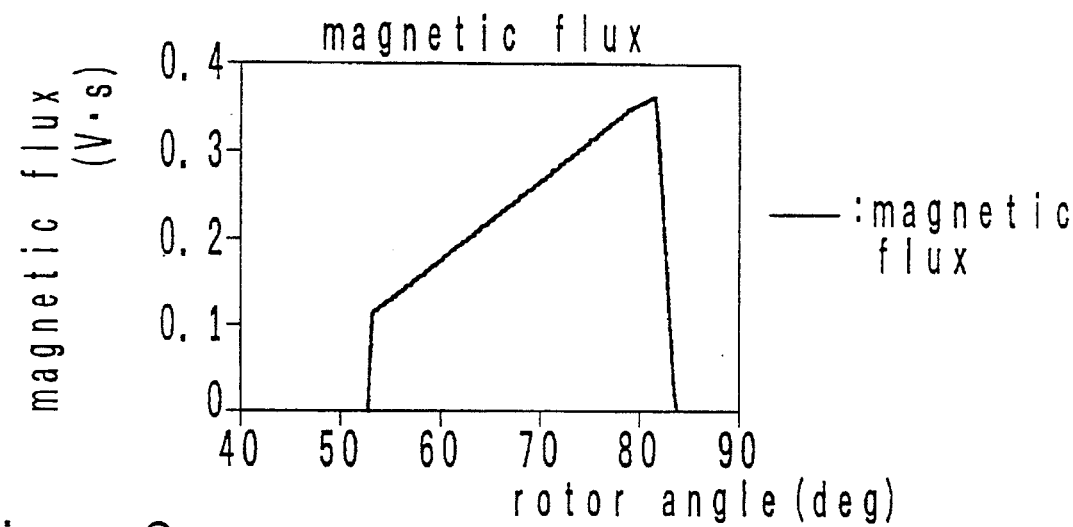
Figure 9C:
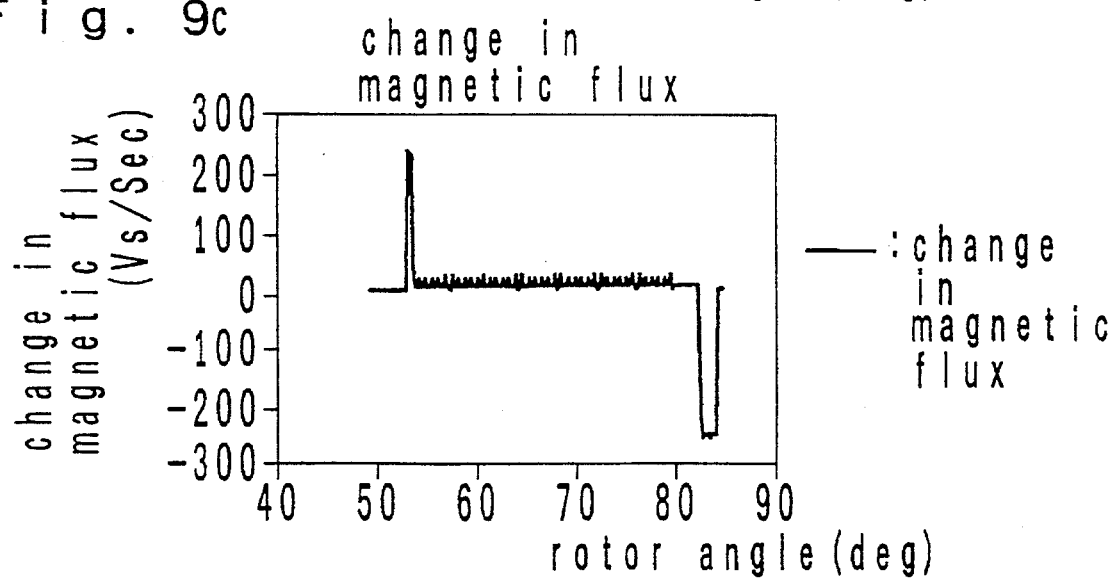
Figure 10A:
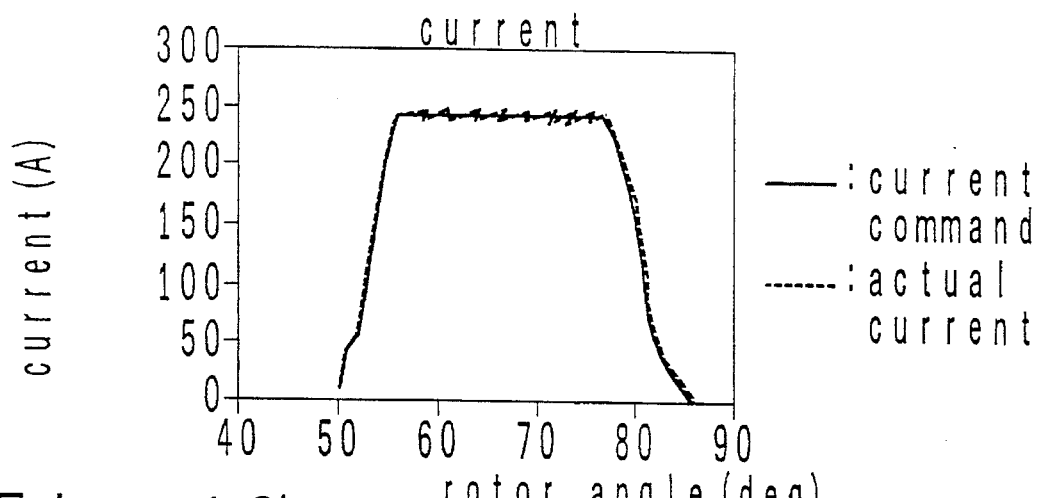
FIGS. 10a, 10b, and 10c are a series of timing charts illustrating changes in the current, magnetic flux and time derivative of magnetic flux when the current is caused to rise and fall more slowly.
Figure 10B:
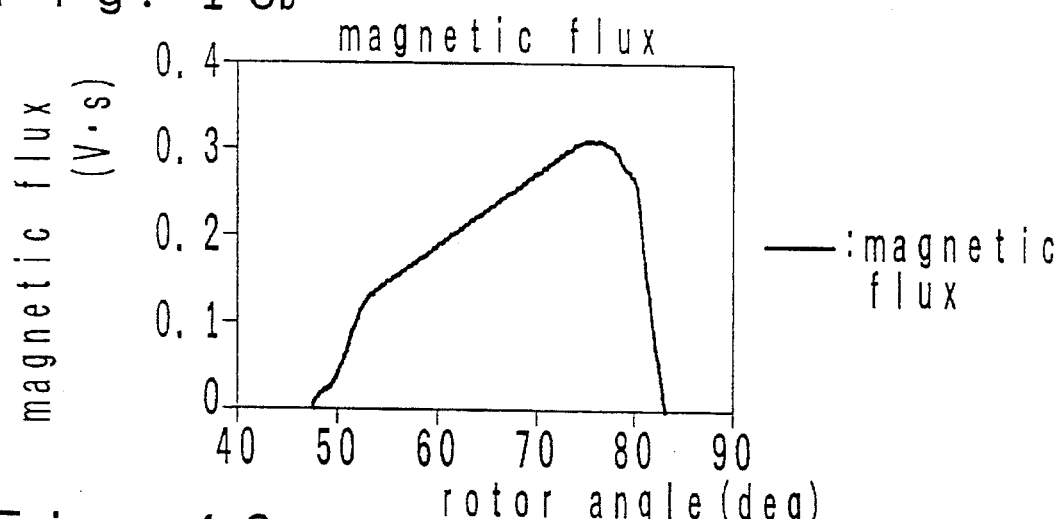
Figure 10C:
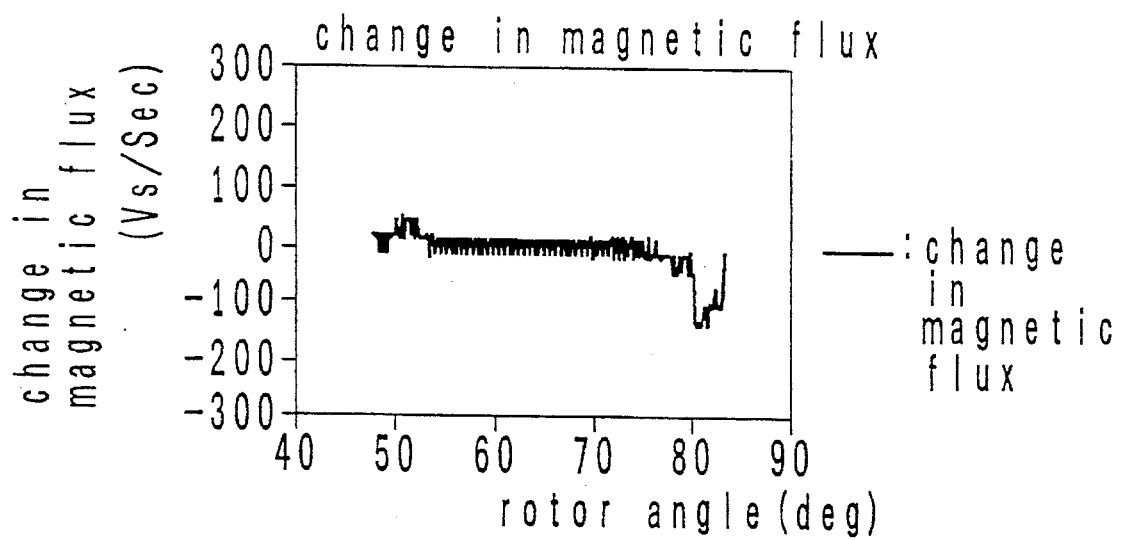

In practice, in order to enable currents having waveforms as shown in FIG. 4 to be passed through the coils of the three phases, each of the memories 15a and 15b stores an energization map as indicated in FIG. 8. Specifically, for each address which corresponds to each rotational position, (which is chosen in this example in increment of 0.5 degree), the memory stores a target value of the current which is to be established at that rotational position. Since information stored by the memories 15a and 15b correspond to the reference voltages Vr2 and Vr1, respectively, the content of the memory 15a is slightly different from the content of the memory 15b so that the relationship Vr2>Vr1 is satisfied. As mentioned previously, since the level of the current passed through the coil 1a changes so as to track the reference voltage Vr1, the waveform of the current which is to be passed through the coil 1a may be stored in the memories 15b and 15a as the reference voltages Vr1, Vr2, thus allowing current to be passed in a manner as shown in FIG. 4.

In this embodiment, it is necessary to switch the energization/deenergization of the coils 1a, 1b and of the three phases for each rotation through 30° of the rotor in the manner shown in FIG. 4. However, by storing waveforms as shown in FIG. 4 in the memories 15b and 15a, the switching of the energization/deenergization which should take place every 30° can be automatically performed in terms of the signals S71 and S72. In other words, it is unnecessary for CPU 11 to perform a switching of the energization/deenergization of the respective coils by itself.

The memory 15c stores "1" information corresponding to the high level H of the signal S5 for the most part of addresses thereof, but stores "0" information (forced interruption information) corresponding to the low level L of the signals S5 at addresses corresponding to an angle or angles where the target current values (Vr1, Vr2) reduce rapidly. Thus, at a rotational position such as a point of commencement of the falling edge of the waveform of the current target values (Vr1, Vr2) where the downward gradient is abrupt and an accelerated rate of change of current is expected to produce a better result, the signal S5 is switched to its low level L in response to the information stored in the memory 15c to accelerate the rate of change of the current in a forcible manner, without resort to the automatic switching by the signal S72. In this manner, the occurrence of a time lag in switching the rate of change of the current can be avoided, thus improving the tracking capability of the current with respect to the target value.

The memories 15a, 15b and 15c can be written into and read out and allows a simultaneous write-in and read-out. The memories 15a, 15b and 15c are connected to CPU 11 through a signal line S2, and CPU 11 updates the content of the memories 15a, 15b and 15c as required.

Figure 6:
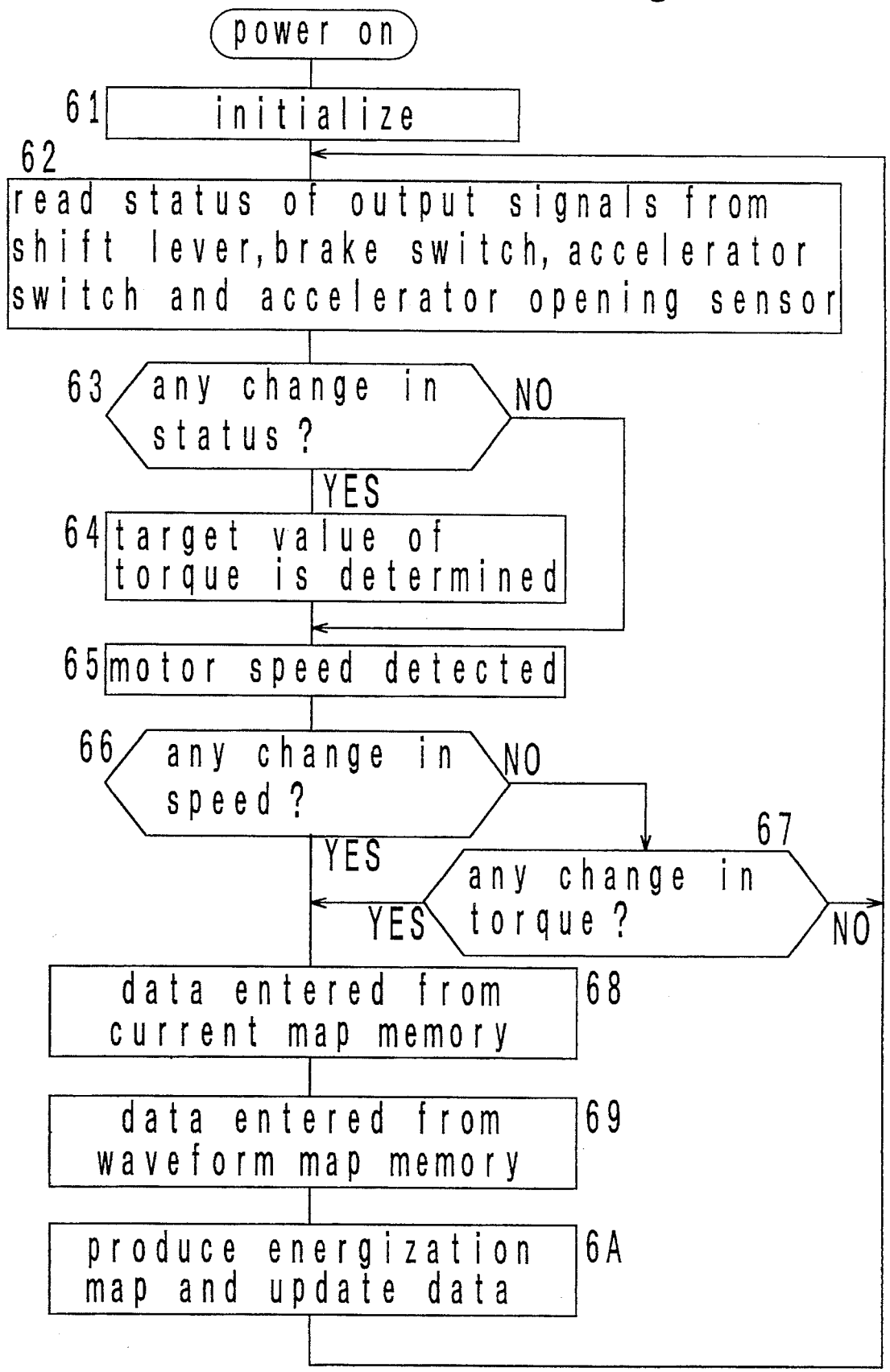
FIG. 6 is a flow chart illustrating the operation of CPU 11.

The operation of CPU 11 is schematically shown in FIG. 6. Describing the operation of CPU 11 with reference to FIG. 6, when the power supply is turned on, an initialization is executed at step 61. Specifically, internal memories within CPU 11 are initialized, and internal timers and modes such as interrupt are set, whereupon a system diagnosis is performed. If no abnormality is found, the operation proceeds to the next step.

At step 62, the status of signals delivered by a shift lever, a brake switch, an accelerator switch and an accelerator opening sensor are read through the input interface 12, and corresponding data are saved in internal memories. In the event a change occurs in the status detected at step 62, the operation proceeds from step 63 to step 64, but otherwise, the operation proceeds from step 63 to step 65.

At step 64, a target value of the driving torque of SR motor 1 is determined on the basis of various status detected at step 62. For example, when the accelerator opening detected by the accelerator opening sensor increases, a target value of the driving torque is also increased. Simultaneously a torque modify flag, indicating a change in the target torque, is set.

At step 65, the rotational speed of SR motor 1 is detected. In this embodiment, the speed sensor 1e connected to the drive shaft of SR motor 1 delivers a pulse signal having a period which varies in accordance with the rotational speed of the drive shaft. CPU 11 determines the pulse period of the signal delivered from the speed sensor 1e, and detects the rotational speed of the motor on the basis of such period. Data representing the rotational speed detected is saved in an internal memory.

When there is a change in the rotational speed of SR motor 1, the operation proceeds from step 66 to step 68, and otherwise, the operation proceeds to step 67. At step 67, the torque modify flag is examined, and if the flag is set, indicating that there is a change in the target torque, the operation proceeds to step 68, but otherwise, the operation returns to step 62.

Figure 7:
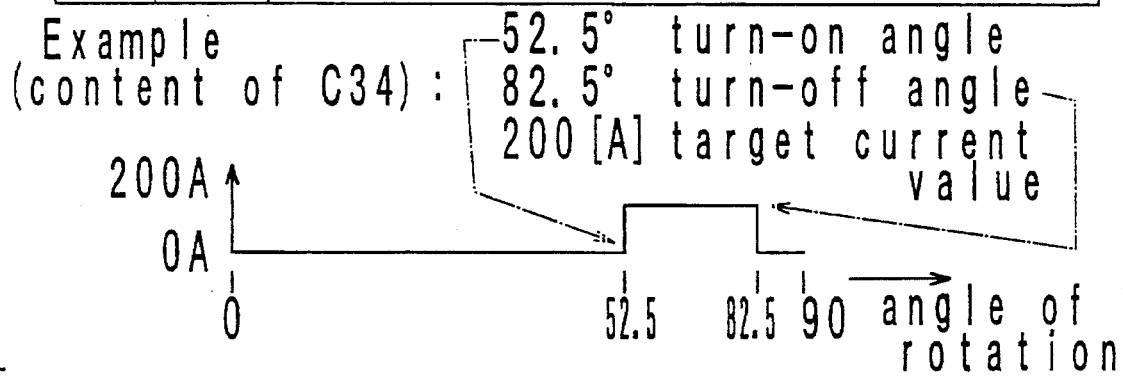
FIG. 7 is a map illustrating the content of a current map memory.

At step 68, data from the current map memory 13a is entered, and at succeeding step 69, data from the waveform map memory 13b is entered. In this embodiment, each of the current map memory 13a and the waveform map memory 13b comprises a read-only memory (ROM) in which various data are previously stored. Specifically, the memory 13a saves data as indicated in FIG. 7 while the memory 13b saves data as indicated in FIG. 11.

Specifically, memory 13a stores a number of data Cnm corresponding to various values of target torque and number of revolutions (n representing a column number corresponding to the torque, and m representing a row number corresponding to the number of revolutions). One set of data Cnm includes a turn-on angle, a turn-off angle and target current value. For example, the content of data C34 for a torque of 20 N·m and a number of revolutions of 500 rpm includes 52.5°, 82.5° and 200 A. This means that for a rotational position in a range from 0° to 90°, a current of 200 A is passed through a particular coil for an angular interval from 52.5° to 82.5°, but the current is interrupted for an angular range from 0° to 52.5° and an angular range from 82.5° to 90°. At step 68, one set of data Cmn which is selected in accordance with the prevailing torque and number of revolutions is entered.

However, a target value of the current which is to be passed through a coil actually has a waveform having a slowly rising and falling edge, rather than a more usual rectangular waveform. Such waveform is determined on the basis of the waveform map memory 13b.

Figure 11:
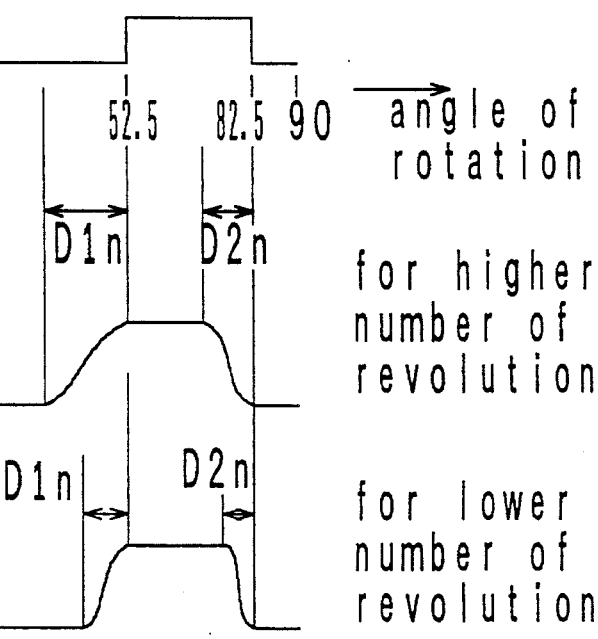
FIG. 11 is a map illustrating the content of a waveform map memory.

Referring to FIG. 11, the waveform map memory 13b stores a number of data D1n and D2n corresponding to various numbers of revolutions or rotational speeds of the motor where n represents a row number corresponding to the number of revolutions. Data D1n represents an angular interval required for the rising edge or a change in the rotational angle required for the current to be increased from a low level (such as 0 A) to a high level (such as 200 A, for example). Similarly data D2n indicates an angular interval required for the falling edge or a change in the rotational angle required for the current to be reduced from high level such as 200 A, for example, to a low level such as 0 A.

By way of example, assuming that data C34 of the current map shown in FIG. 7 is to be used, the rising of the target current value is initiated at an angle D1n before the turn-on angle of 52.5°, thus changing the waveform of the target current value so that the current gently rises to 100% value at the angle of 52.5°. Similarly, the falling of the target current value is initiated at an angle D2n before the turn-off angle of 82.5°, thus changing or moderating the target current value so that the falling is completed at the angle of 82.5°.

Data D1n and D2n in the waveform map memory are predetermined so that the current rises and falls over a time interval (or angle) which is optimum for each number of revolutions (rpm). If the current rises or falls too rapidly, the time derivative of the magnetic flux upon switching the energization will be excessively high, resulting in increased magnitude of oscillations and acoustic noises. On the contrary, if the current rises or falls too slowly, the driving torque will be substantially reduced to reduce the driving efficiency. Accordingly, values which are effective to suppress the oscillations and acoustic noises sufficiently while minimizing a reduction in the driving efficiency are chosen as D1n and D2n. In particular, the rising time corresponding to D1n and the falling time corresponding to D2n are each chosen to be greater than one-half the period of the natural frequency of SR motor 1. In this manner, the frequency of oscillations which occur upon switching the energization is made lower than the natural frequency of SR motor 1, thus preventing a resonance and suppressing the oscillations and acoustic noise level from increasing.

At step 69 shown in FIG. 6, one set of data D1n, D2n are selected from the waveform map memory 13b in accordance with the prevailing number of revolutions, and are entered into CPU 11. For example, when the number of revolutions is 500 rpm, data d14 and d24 are selected for entry.

At subsequent step 6A, data for an energization map as shown in FIG. 8 is produced on the basis of data Cnm entered at step 68 and data D1n, D2n entered at step 69, and the latest energization map thus formed is used to update or rewrite data in the memories 15a, 15b and 15c of the current waveform shaping circuit shown in FIG. 2. It should be understood that the energization map is not only written into the memories 15a, 15b and 15c for one phase, as indicated in FIG. 2, but are formed and written into the memories of all three phases.

The actual formulation of an energization map will now be described. Considering the third phase, a target current value for an angle position A1 which precedes the turn-on angle Aon contained in data Cnm by the angle D1n, which is required for the rising edge, is chosen to be 0, and the target current value (which may be 200 A, for example) is chosen for the turn-on angle Aon which is contained in data Cnm. Data between angle positions A1 and Aon are interpolated so that a smoothly rising curve joins between the low point and the high point on the waveform. Thus, values which approximate such curve are calculated every 0.5° of the rotor angle, and are used as target current values at respective angles. In a similar manner, a target current value at an angle position A2 which precedes the turn-off angle Aoff contained in data Cnm by the angle D2n, which is required for the falling edge, is chosen to be equal to the target current value contained in Cnm (which may be 200 A, for example) and the target current value at the position of the turn-off angle Aoff is chosen to be 0. As before, data is interpolated between the angle positions A2 and Aoff so that the high point and the low point on the waveform can be joined by a smoothly falling curve. Thus, values which approximate such curve are calculated every 0.5° of the rotor angle, and are used as the target current values at the respective angles. At angle positions other than those mentioned above, 0 is written as a target current value.

Data contained in the energization map for the third phase which is thus produced is phase displaced by 30° and 60°, respectively, to be used as the energization map for the first and the second phase, respectively. The energization map as shown in FIG. 8 is produced in this manner. It is to be understood that the energization map shown in FIG. 8 only indicate data (Vr1) which is to be written into the memory 15b, and that data (Vr2) which is to be written into the memory 15a assume slightly greater values than the values shown in the energization map in FIG. 8.

In this embodiment, the current to be passed through the coil 1a is controlled on the basis of data stored in the memories 15a, 15b and 15c, and therefore writing the energization map into the memories (memories 15a, 15b and 15c for three phases) by CPU 11 is all that is necessary to assure that a switching of the energization of the individual coils take place automatically through a hardware circuit.

CPU 11 repeatedly executes the operation of the steps 62 to 6A mentioned above. When the rotational speed and the torque of SR motor which are detected remain constant, the operation loops around steps 66—67—62, but in the event the rotational speed changes or the torque changes, the operation proceeds through steps 68—69—6A—62, whereby the energization maps on the memories 15a, 15b and 15c are updated.

A second embodiment of the invention will now be described. In the second embodiment, the operation of CPU 11 shown in FIG. 1 is altered in the manner shown in FIG. 12; the content (or current map) of the current map memory 13a is altered as shown in FIG. 14; and the content (or the waveform map) of the waveform map memory 13b is altered in the manner illustrated in FIG. 13. However, in other respects, the arrangement and the operation remain the same as in the previous embodiment.

Figure 13:
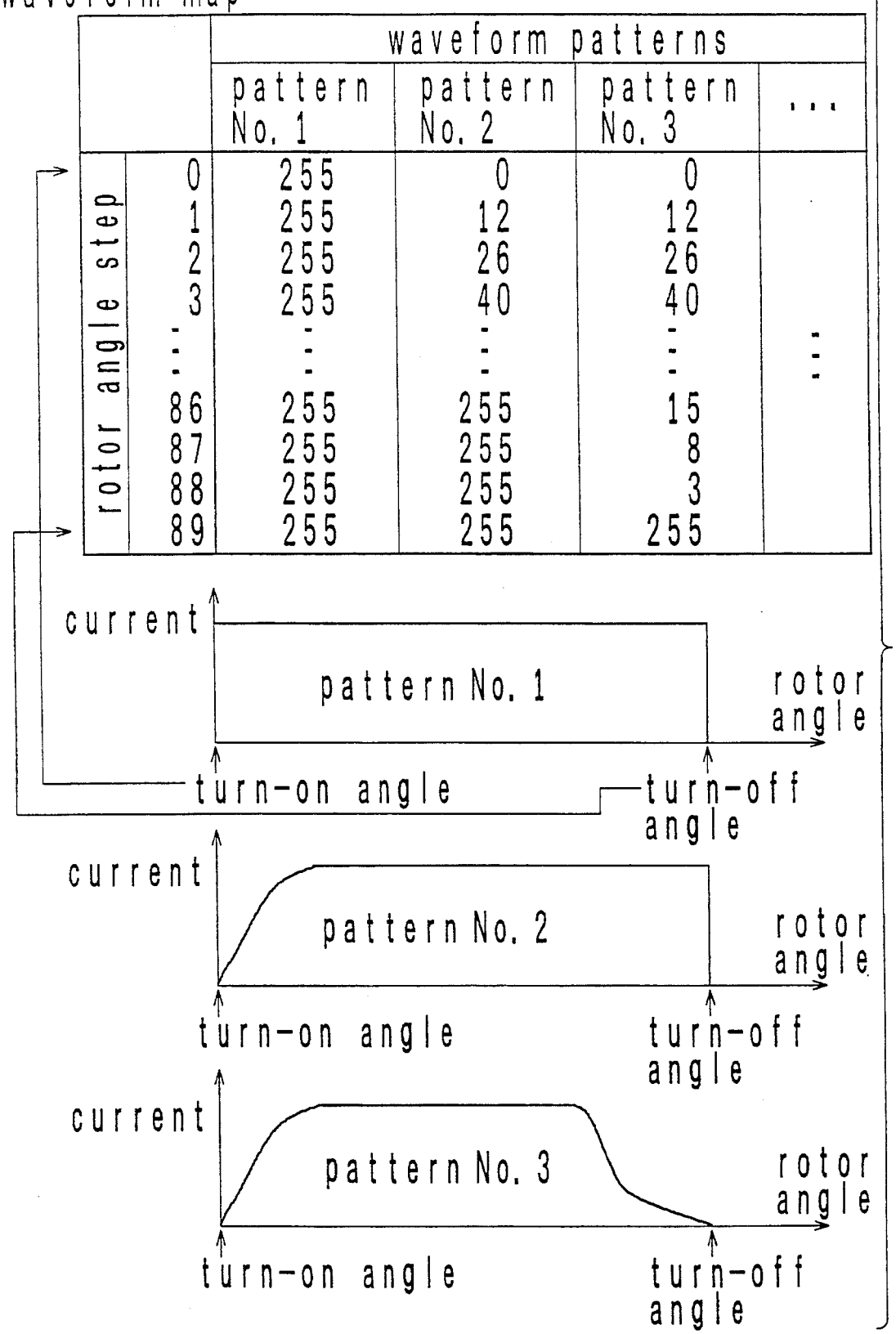
FIG. 13 is a map illustrating the content of a waveform map memory of the modification.
Figure 14:
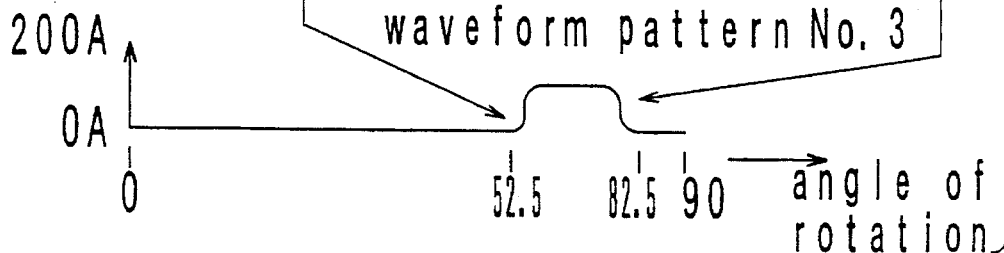
FIG. 14 is a map illustrating the content of a current map memory of the modification.

Referring to FIG. 13, waveform patterns include a number of waveform patterns No. 1, 2, 3, . . . , each of which contain numerical data (in a range from 0 to 255), corresponding to selected rotor angles, which are previously registered. In the example shown, the rotor angle step 0 corresponds to the turn-on angle where the energization is initiated or where the wave form begins to rise, and the rotor angle step 89 corresponds to the turn-off angle where the energization is terminated. Each of the waveform patterns contains a number of numerical data representing current levels, which corresponds to individual rotor angle steps, which are in turn determined by dividing the span between the turn-on and the turn-off angle into 90 equal segments.

Referring to FIG. 14, the current map shown contains a multiplicity of data Cnm corresponding to various values of the target torque and the number of revolutions or rotational speed of the motor where n represents a column number corresponding to the torque, and m represents a row number corresponding to the number of revolutions. One set of data Cmn include a turn-on angle, a turn-off angle, an upper limit of current and a waveform pattern No. For example, data C34 for a torque of 20 N.m and the number of revolutions of 500 rpm has as its content 52.5°, 82.5°, 200 A and pattern No. 3.

Figure 12:
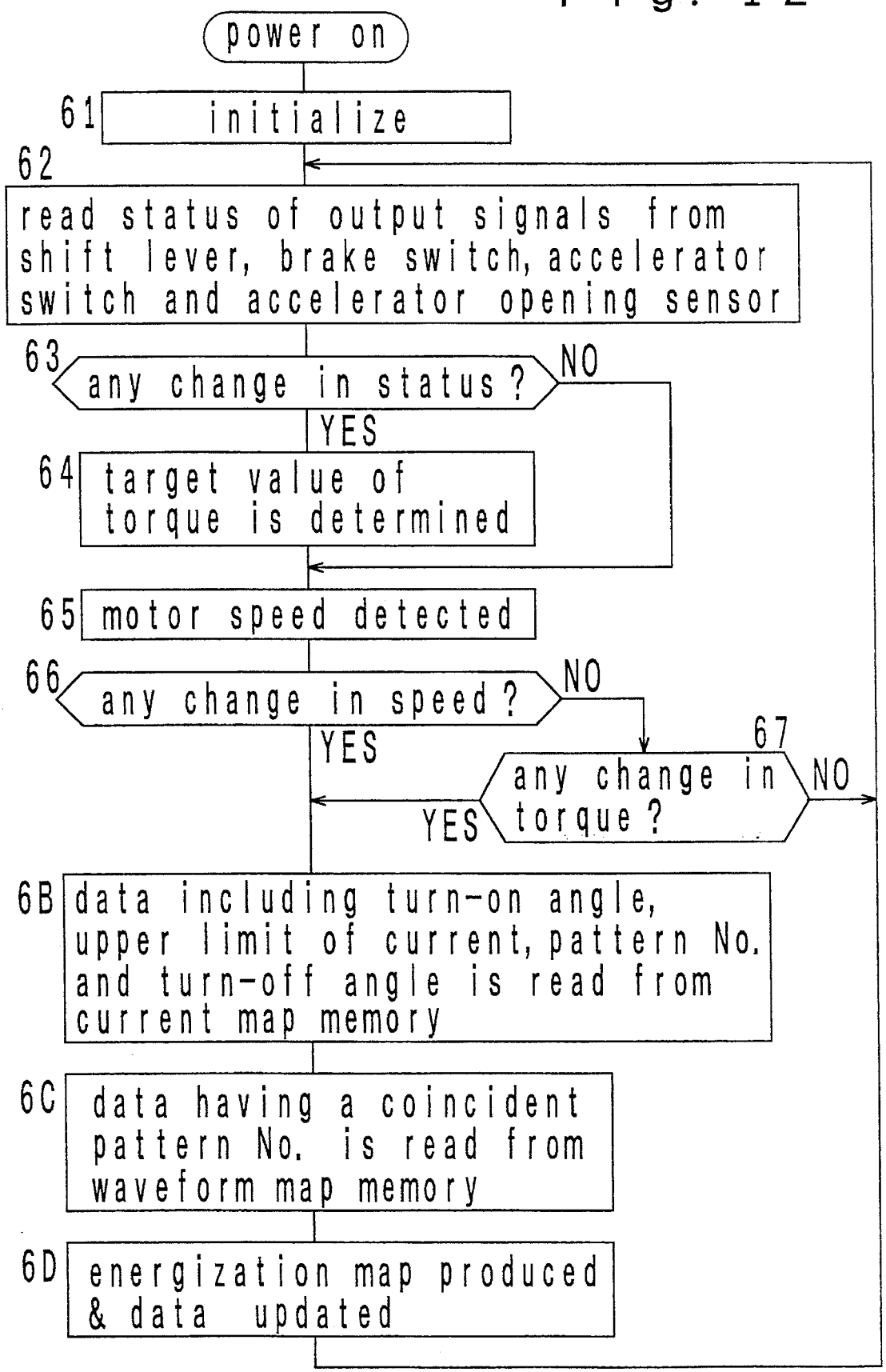
FIG. 12 is a flow chart illustrating the operation of CPU 11 according to a modification.

Referring to FIG. 12, it will be noted that the operation of CPU 11 differs from the operation of the previous embodiment only in respect to steps 6B, 6C and 6D. At step 6B, one set of data corresponding to the prevailing torque and number of revolutions is selected, and the turn-on angle, the turn-off angle, upper limit of current and waveform pattern No. data as shown in FIG. 14 is entered from the current map memory. At next step 6C, a set of waveform data covering rotor angle steps 0 to 89 and having a waveform pattern No. which coincides with the waveform pattern No. entered at step 6B is entered from the waveform map memory. Finally at step 6D, data for an energization map such as shown in FIG. 8 is produced on the basis of data entered at steps 6B and 6C. Specifically, data Dx corresponding to each of the rotor angle steps 0 to 89 of the waveform map are allocated to each rotor angle which is determined by dividing the span between the turn-on angle and the turn-off angle of the current map into 90 equal segments, and for each rotor angle, the upper limit of current is multiplied by (Dx/255) to provide a current command value. Using the latest energization map thus formed, data in the memories 15a, 15b and 15c of the current waveform shaping circuit shown in FIG. 2 are updated. It should be understood that data are updated not only for the memories 15a, 15b and 15c of one phase, but the energization maps are also formed for the memories of other phases so that data therein may be similarly updated.

As described, in accordance with the invention, the current waveform, in particular, the rising and the falling edge thereof as the coil is turned on or off is modified in accordance with the rotational speed of the rotor which is detected by the current waveform control means, whereby an optimum energization waveform can be automatically selected to suppress a reduction in the driving torque while sufficiently suppressing the acoustic noise level.

In addition, by controlling the waveform so that the time interval required for the current to rise or fall is greater than one-half the period of the natural oscillation of SR motor, the frequency of oscillations which result from the switching of the energization can be maintained below the natural frequency of SR motor. In this manner, the occurrence of a resonance is prevented in a reliable manner, thus avoiding an increase in the acoustic noise level.

What is claimed is:

1. A controller for switched reluctance motor including means for detecting a rotational position of a rotor and in which an electrical coil which is used to drive the rotor is turned on or off at a particular rotational position of each pole on the rotor; characterized by speed detecting means for detecting the rotational speed of the rotor; and current waveform control means for modifying the current waveform as the current rises or falls to turn on or off the coil by modifying the current rising speed or the current falling speed in accordance with the rotational speed-of the rotor which is detected by the speed detecting means.

2. A controller according to claim 1 in which the current waveform control means chooses a time interval required for the current to rise or fall to be greater than one-half the period of natural oscillation of the switched reluctance motor so that a time interval over which a magnetic attraction varies is greater than one-half the period of the natural oscillation.

3. A controller according to claim 1, further including waveform map memory means for storing a relationship between the rotational speed of the rotor and the time interval required for the current to rise or fall.

4. A controller according to claim 1, further including waveform map memory means for storing a plurality of waveforms each representing a relationship between the rotational angle of the rotor and the current level.

5. A controller according to claim 1, further including current map memory means for storing a relationship between the rotational speed of and the torque generated by the rotor on one hand and a reference rotational angle where the coil is turned on or off on the other hand.

6. A controller for switched reluctance motor including means for detecting a rotational position of a rotor and in which an electrical coil which is used to drive the rotor is turned on or off at a particular rotational position of each pole on the rotor; characterized by speed detecting means for detecting the rotational speed of the rotor; and current waveform control means for modifying the current waveform as the current rises or falls to turn on or off the coil in accordance with the rotational speed of the rotor which is detected by the speed detecting means and for choosing a time interval required for the current to rise or fall to be greater than one-half the period of natural oscillation of the switched reluctance motor so that a time interval over which a magnetic attraction varies is greater than one-half the period of the natural oscillation.

* * * * *